United States Patent
Park et al.

(10) Patent No.: US 10,171,942 B2
(45) Date of Patent: Jan. 1, 2019

(54) METHODS, APPARATUSES, SYSTEMS, AND COMPUTER READABLE MEDIA FOR CHANGING SETTINGS OF MOBILE TERMINALS USING CELL IDENTIFICATION INFORMATION

(71) Applicant: NAVER Business Platform Corp., Seongnam-si, Gyeonggi-do (KR)

(72) Inventors: Weongi Park, Seongnam-si (KR); Ho Jin Lee, Seongnam-si (KR); Jaewook Yoo, Seongnam-si (KR); Eun Yong Cheong, Seongnam-si (KR); Byeong-Ryeol Sim, Seongnam-si (KR); Byung-Jo Kim, Seongnam-si (KR); Junghoon Kim, Seongnam-si (KR); Sungpil Choi, Seongnam-si (KR)

(73) Assignee: Naver Business Platform Corp., Seongnam-si (KR)

( * ) Notice: Subject to any disclaimer, the term of this patent is extended or adjusted under 35 U.S.C. 154(b) by 68 days.

(21) Appl. No.: 14/939,550

(22) Filed: Nov. 12, 2015

(65) Prior Publication Data

US 2016/0192141 A1    Jun. 30, 2016

(30) Foreign Application Priority Data

Dec. 26, 2014   (KR) .......................... 10-2014-0191021

(51) Int. Cl.
*H04W 4/00*     (2018.01)
*H04W 4/02*     (2018.01)
(Continued)

(52) U.S. Cl.
CPC ............. *H04W 4/023* (2013.01); *H04W 4/18* (2013.01); *H04W 64/00* (2013.01)

(58) Field of Classification Search
CPC ................................................... H04W 4/023
See application file for complete search history.

(56) References Cited

U.S. PATENT DOCUMENTS

| 8,145,234 B1 | 3/2012 | Leonard et al. |
| 2005/0215268 A1 | 9/2005 | Cheng |

(Continued)

FOREIGN PATENT DOCUMENTS

| JP | H11-252622 A | 9/1999 |
| JP | 2000188781 A | 7/2000 |

(Continued)

OTHER PUBLICATIONS

Taiwanese Office Action dated Dec. 13, 2016 for corresponding Taiwanese Patent Application No. 104 137 879.

(Continued)

*Primary Examiner* — Mazda Sabouri
(74) *Attorney, Agent, or Firm* — Harness, Dickey & Pierce, P.L.C.

(57) ABSTRACT

Provided is a location based service providing method and system for automatically changing a setting of a mobile terminal based on a location of the mobile terminal determined based on cell information. A location based service providing method performed by a location based service providing system may include receiving information for verifying a location of a mobile terminal from the mobile terminal, determining location information that matches the information in a location information database as a current location of the mobile terminal, and changing a setting of the mobile terminal to be a user setting in response to the current location of the mobile terminal corresponding to a location registered in advance to apply the user setting.

17 Claims, 6 Drawing Sheets

(51) Int. Cl.
*H04W 4/18* (2009.01)
*H04W 64/00* (2009.01)

(56) References Cited

U.S. PATENT DOCUMENTS

| | | | |
|---|---|---|---|
| 2009/0143080 A1 | 6/2009 | Brede et al. | |
| 2010/0202408 A1 | 8/2010 | Lee | |
| 2011/0312333 A1 | 12/2011 | I'Anson et al. | |
| 2012/0155302 A1* | 6/2012 | Jeong | H04W 64/00 370/252 |

FOREIGN PATENT DOCUMENTS

| | | |
|---|---|---|
| JP | 2002-095060 A | 3/2002 |
| JP | 2002330470 A | 11/2002 |
| JP | 2003009238 A | 1/2003 |
| JP | 2005072941 A | 3/2005 |
| JP | 2005094647 A | 4/2005 |
| JP | 2005512429 A | 4/2005 |
| JP | 2005160046 A | 6/2005 |
| JP | 2007189594 A | 7/2007 |
| JP | 2008-537667 A | 9/2008 |
| JP | 2010-251984 A | 11/2010 |
| JP | 2011-527530 A | 10/2011 |
| JP | 2012074826 A | 4/2012 |
| JP | 2012156804 A | 8/2012 |
| JP | 2014504369 A | 2/2014 |
| JP | 2014060600 A | 4/2014 |
| JP | 2014120983 A | 6/2014 |
| KR | 20030006322 A | 1/2003 |
| KR | 20080099940 A | 11/2008 |
| KR | 20110072100 A | 6/2011 |
| KR | 20130030430 A | 3/2013 |

OTHER PUBLICATIONS

Japanese Office Action dated Oct. 11, 2016 for corresponding Japanese Patent Application No. 2015-220913.
Korean Office Action dated Aug. 17, 2016 for corresponding Korean Patent Application No. 2014-0191021.
Japanese Office Action dated Dec. 26, 2017 for corresponding Japanese Patent Application No. 2016-238578.
Japanese Office Action for corresponding Japanese Application No. 2016-238578 dated Jul. 10, 2018.

* cited by examiner

METHODS, APPARATUSES, SYSTEMS, AND COMPUTER READABLE MEDIA FOR CHANGING SETTINGS OF MOBILE TERMINALS USING CELL IDENTIFICATION INFORMATION

CROSS-REFERENCE TO RELATED APPLICATION

This application claims priority under 35 U.S.C. § 119 to Korean Patent Application No. 10-2014-0191021 filed on Dec. 26, 2014 in the Korean Intellectual Property Office (KIPO), the entire contents of which are incorporated herein by reference.

BACKGROUND

Field

One or more example embodiments relate to a location based service providing methods, apparatuses, systems, and/or computer readable media for automatically setting various functions of a mobile terminal based on the location of the mobile terminal Description of Related Art This section provides background information related to the present disclosure which is not necessarily prior art.

A mobile terminal, such as a smartphone, tablet, laptop computer, wearable smart device, portable gaming device, personal digital assistant, (PDA), etc., refers to an intelligent computing terminal capable of performing computer supporting functions, such as Internet communication, information search, etc. A user may install one or more desired applications in the mobile terminal. Using the mobile terminal, the user may utilize a variety of functions based on the installed application.

In the meantime, since various functions are available, various settings related to the functions are present in the mobile terminal. For example, the user may change various settings of the mobile terminal, such changing the state of a wireless fidelity (WiFi) module to be in an ON-state (e.g., powered on) when the user is at their office, changing a mode of the mobile terminal to be in a vibrating mode, executing a music application, reducing an application-by-application notification sound, etc.

As described above, the user may need to change various settings of the mobile terminal for various locations that the user may be in. However, it is very inconvenient and complex for the user to directly change all of the settings every time the user moves to a location.

Also, although the user may appropriately change a setting based on a location of the user, the location of the user may be erroneously verified. For example, when the user is at an office in a region A, the current location of the user may be verified as being at the user's home in a region B. As a result, due to the location error, the mode of the mobile terminal that is to be set to be in a vibrating mode at the office may be set to be in a bell mode as if the mobile terminal was at the user's home (i.e., the setting appropriate for the home location).

Accordingly, there is a need for technology to more accurately and quickly verify a location of a user and change at least one setting of a mobile terminal based on the verified location of the user.

SUMMARY

This section provides a general summary of the disclosure, and is not a comprehensive disclosure of its full scope or all of its features.

Some example embodiments provide a location based service providing method that may more accurately and quickly determine a current location of a mobile terminal based on cell identification information, and a system for distributing an installation file of an application that controls a mobile terminal to perform the location based service providing method.

Some example embodiments also provide a location based service providing method that may improve battery consumption of a mobile terminal by automatically changing a setting of the mobile terminal to be a user setting registered in advance based on a determined current location (for example, a company, home, a school, etc.,) of the mobile terminal, and a system for distributing an installation file of an application that controls the mobile terminal to perform the location based service providing method.

Further areas of applicability will become apparent from the description provided herein. The description and specific examples in this summary are intended for purposes of illustration only and are not intended to limit the scope of the present disclosure.

According to at least one example embodiment, there is provided a location based service providing method performed by a location based service providing apparatus, where the method may include receiving, using at least one processor of the location based service providing apparatus, location information for verifying a location of a mobile terminal from the mobile terminal, determining, using the at least one processor, whether the received location information corresponds to a registered location in a location information database, associating, using the at least one processor, the registered location as a current location of the mobile terminal based on the results of the determining of the received location information, and changing at least one setting of the mobile terminal to be at least one user setting registered in the location information database, the at least one user setting associated with the registered location in the location information database.

The determining of the received location information may include determining, as the current location of the mobile terminal, location information that corresponds to at least one of cell information, global positioning system (GPS) coordinates, a beacon identifier, and a media access control (MAC) address of a wireless access point (AP) that indicate the current location of the mobile terminal.

The determining of the received location information may include determining, as the current location of the mobile terminal, location coordinates corresponding to a centroid value of a cell in which the mobile terminal is present.

The changing of the at least one setting of the mobile terminal may include changing a state of a wireless AP module of the mobile terminal based on an analysis of the current location of the mobile terminal and the registered location.

The changing of the setting of the at least one user terminal may include changing the state of the wireless AP module of the mobile terminal to be in an ON-state in response to the registered location being within a desired reference radius from location coordinates corresponding to a centroid value of a cell in which the mobile terminal is present.

The determining of the received location information may include updating the current location of the mobile terminal using the wireless AP module of which the state is changed to be in an ON-state, and the changing of the setting of the mobile terminal includes changing the at least one setting of the mobile terminal to be the at least one user setting in response to an updated current location corresponding to the registered location.

The determining of the received location information may include estimating a location of a first base station that provides coverage to the mobile terminal based on cell identification information of a neighboring second base station located proximate to the first base station, in response to cell information of the mobile terminal being absent in the location information database, and determining the current location of the mobile terminal based on a cell shape corresponding to the estimated location of the first base station.

The determining of the current location of the mobile terminal based on the cell shape may include determining, as the current location of the mobile terminal, location coordinates corresponding to a centroid value of a cell covered by the estimated first base station, and matching location coordinates corresponding to a centroid value of a cell in which the mobile terminal is present with cell identifier information of the cell, and adding the matching information to the location information database.

Cell information indicating the current location of the mobile terminal may at least one of identification information of a country in which the mobile terminal is located, communication company identification information, location area code (LAC) information, identification information of a base station that provides coverage to the mobile terminal, and identification information of a cell covered by the base station.

According to at least one example embodiment, there is provided a location based service providing apparatus that may include a memory having computer readable instructions stored thereon, and at least one processor configured to execute the computer readable instructions to receive location information for verifying a location of a mobile terminal from the mobile terminal, determine whether the received location information that corresponds to a registered location in a location information database as a current location of the mobile terminal, associate the registered location as a current location of the mobile terminal based on the results of the determining of the received location information, and change at least one setting of the mobile terminal to be at least one user setting registered in the location information database, the at least one user setting associated with the registered location in the location information database.

The at least one processor may be further configured to determine, as the current location of the mobile terminal, location information that matches at least one of cell information, global positioning system (GPS) coordinates, a beacon identifier, and a media access control (MAC) address of a wireless access point (AP) that indicate the current location of the mobile terminal.

The at least one processor may be further configured to determine, as the current location of the mobile terminal, location coordinates corresponding to a centroid value of a cell in which the mobile terminal is present.

The at least one processor may be further configured to change a state of a wireless AP module of the mobile terminal based on an analysis of the current location of the mobile terminal and the registered location.

The at least one processor may be further configured to update the current location of the mobile terminal using the wireless AP module of which the state is changed to be in an ON-state, and change the setting of the mobile terminal includes changing the at least one setting of the mobile terminal to be the at least one user setting in response to the updated current location corresponding to the registered location.

The at least one processor may be further configured to estimate a location of a first base station that provides coverage to the mobile terminal based on cell identification information of a neighboring second base station located proximate to the first base station, in response to cell information of the mobile terminal being absent in the location information database, and determine the current location of the mobile terminal based on a cell shape corresponding to the estimated location of the first base station.

According to at least one example embodiment, there is provided a file distribution system for distributing an installation file for installing an application in a mobile terminal of a user, the file distribution system including a server, where the server may include a memory having computer readable instructions stored thereon, and at least one processor configured to execute the computer readable instructions to store and manage the installation file, and transmit the installation file to the mobile terminal in response to a request from the mobile terminal. The application may be configured to control the mobile terminal to determine, as a current location of the mobile terminal, whether received location information from the mobile terminal corresponds to a registered location in a location information database, and control the mobile terminal to change at least one setting of the mobile terminal to be at least one user setting registered in the location information database, the at least one user setting associated with the registered location in the location information database.

The application may be further configured to control the mobile terminal to determine, as the current location of the mobile terminal, location coordinates corresponding to a centroid value of a cell in which the mobile terminal is present, based on cell information of the mobile terminal.

The application may be further configured to control the mobile terminal to change a state of a wireless access point (AP) module to be in an ON-state in response to the registered location being within a desired reference radius from location coordinates corresponding to a centroid value of a cell in which the mobile terminal is present.

The application may be further configured to control the mobile terminal to maintain a state of a wireless AP module of the mobile terminal to be in an OFF-state in response to the registered location being outside a desired reference radius from location coordinates corresponding to a centroid value of a cell in which the mobile terminal is present.

According to at least one example embodiment, there is provided a system for providing location based services that may include at least one mobile terminal and configured to collect location information related to the at least one mobile terminal, and at least one server, the server including at least one processor and a location information database including at least one registration location information, the at least one registration location information corresponding to at least one location to which at least one user setting is to be applied on the at least one mobile terminal, the at least one processor configured to receive the collected location information from the at least one mobile terminal, determine whether the received collected location information corresponds to at least one of the registered location information, and transmitting at least one change setting instruction, to the at least one mobile terminal the change setting instruction including the at least one user setting to be applied, based on the results of the determination.

The at least one mobile terminal may further include a memory having at least one application stored thereon, and at least one processor configured to execute the at least one application to receive the transmitted at least one change setting instruction, and apply the at least one user setting to at least one setting of the mobile terminal.

The at least one mobile terminal may further include at least one wireless AP transceiver configured to perform at least one of WiFi communications, 3G mobile communications, 4G mobile communications, GSM communications, and CDMA communications, at least one of a GPS receiver, a beacon transceiver, a Bluetooth transceiver, a RFID transceiver, and a NFC transceiver, and the at least one processor of the mobile terminal configured to collect cell identification information using the at least one wireless AP transceiver.

The at least one change setting may relate to at least one setting associated with an application installed on the mobile terminal, an operating system installed on the mobile terminal, and a hardware component of the mobile terminal.

According to at least one example embodiment, since a current location of a mobile terminal is determined based on cell identification information, it is possible to further accurately and quickly determine the current location of the mobile terminal.

Also, according to at least one example embodiment, it is possible to reduce battery consumption of a mobile terminal by automatically changing a setting of the mobile terminal to be a user setting registered in a database based on a determined current location (for example, a company, home, a school, etc.) of the mobile terminal.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
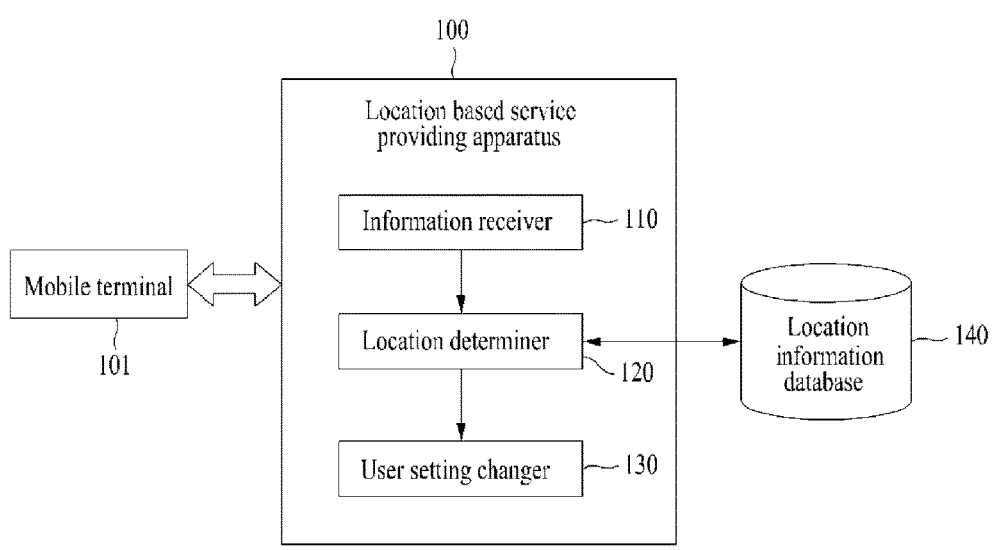
FIG. 1 is a diagram illustrating a system for changing settings of at least one mobile terminal using cell identification information, the system including at least one mobile terminal and at least one location based service providing apparatus, according to some example embodiments.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating a system for changing settings of mobile terminals using cell identification information according to some example embodiments. FIG. 1 illustrates a mobile terminal 101 of a user and a location based service providing apparatus 100.

The mobile terminal 101 may be a portable device, such as a smartphone, tablet, laptop computer, wearable smart device, personal digital assistant (PDA), portable gaming console, and the like, of the user capable of performing at least mobile communications and data communications. The location based service providing apparatus 100 may determine a current location of the mobile terminal 101 based on information and/or data located in a location information database 140 in response to a request from the mobile terminal 101.

Here, the location based service providing apparatus 100 may include an information receiver 110, a location determiner 120, and a user setting changer 130 in order to further accurately process and determine a current location of the mobile terminal 101 based on cell identification information associated with the mobile terminal 101. The location based service providing apparatus may also provide a service to the mobile terminal 101 based on the determined current location of the mobile terminal 101.

For example, when a current location of the mobile terminal 101 corresponds to a location such as a company, a home, a school, etc., registered in advance by the user, the location based service providing apparatus 100 may automatically change a setting of the mobile terminal 101 based on user setting information that is registered in advance by the user to be suitable for the registered location. For example, in a case in which the user has preset a mode of the mobile terminal 101 to be in a vibrating mode or a mute mode, a notification of a chat application to be in a vibrating mode, and a state of Wireless Fidelity (WiFi) module to be in an On-state, once a current location of the mobile terminal 101 is verified as a company, the location based service providing apparatus 100 may automatically change settings of the mobile terminal 101 by transmitting a change setting instruction to a user setting information application set in the mobile terminal 101, such as changing a bell sound to be in a vibrating mode or a mute mode, changing a notification of the chat application to be in a vibrating mode or a mute mode, and changing a state of a wireless access point (AP) module to be in an ON-state. The wireless AP module may include, for example, a transceiver configured to perform at least one of a WiFi communications, a 3G mobile communications, a 4G mobile communications, a GSM communications, a CDMA communications, etc.

Although FIG. 1 describes that the mobile terminal 101 and the location based service providing apparatus 100 are provided as separate constituent elements, it is only an example and the location based service providing apparatus 100 may be included in the mobile terminal 101. For example, the mobile terminal 101 may determine location coordinates that match cell identification information of the mobile terminal 101 by executing a corresponding application (app) and the like to utilize a location based service for automatically changing settings of the mobile terminal 101 based on user setting information that is registered in advance based on the location of the mobile terminal 101. When the determined location coordinates correspond to the registered location, the mobile terminal 101 may change settings of the mobile terminal 101 based on user setting information that is registered in association with the registered location.

Further, although FIG. 1 describes that the location information database 140 is included in the location based service providing apparatus 100, it is only an example. The location information database 140 may be included in a separate storage device connected to the location based service providing apparatus 100 over a network.

Additionally, while FIG. 1 depicts only a single mobile terminal, location based service providing apparatus, and location information database, the example embodiments are not limited thereto, and any number of mobile terminals, location based service providing systems, location information databases, and/or other components may be present in various example embodiments.

Figure 2:
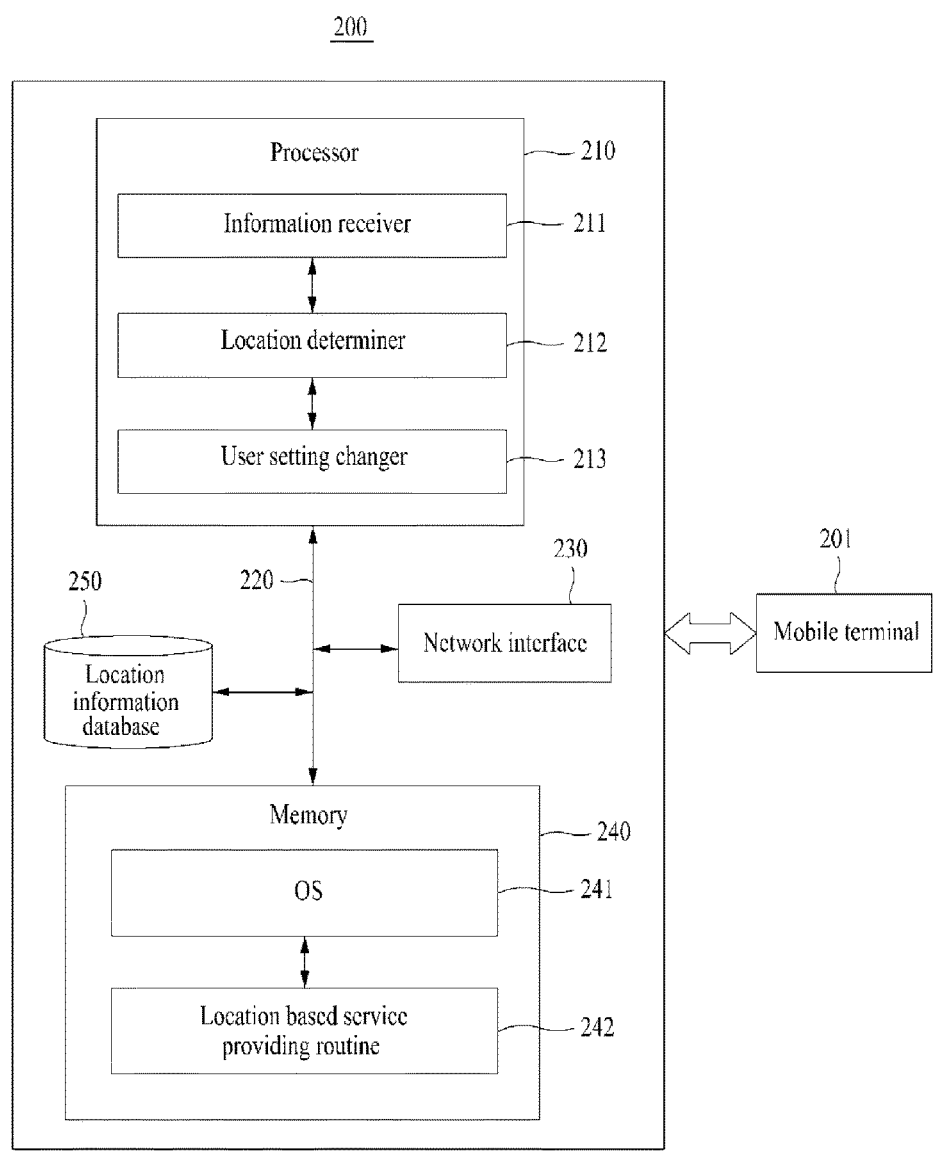
FIG. 2 is a block diagram illustrating a configuration of a location based service providing apparatus according to some example embodiments.
Figure 3:
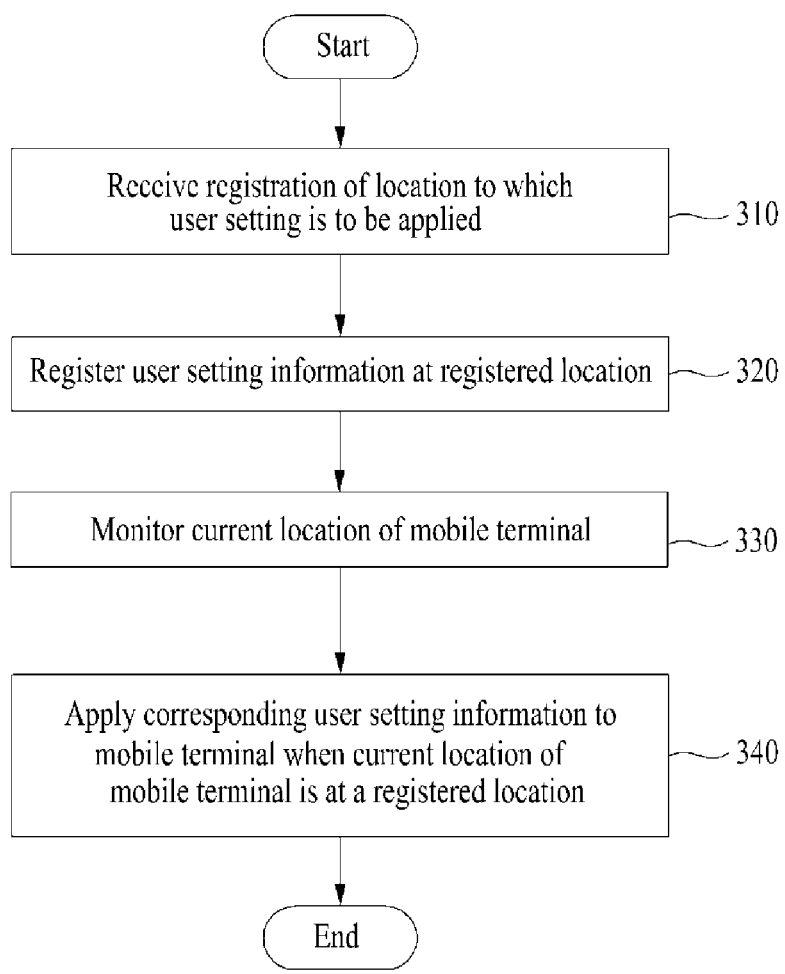
FIG. 3 is a flowchart illustrating an operation of changing a setting of a mobile terminal based on a current location of the mobile terminal that is determined based on cell identification information according to some example embodiments.

FIG. 2 is a block diagram illustrating an example configuration of a location based service providing apparatus according to some example embodiments, and FIG. 3 is a flowchart illustrating an operation of changing a setting of a mobile terminal based on a current location of the mobile terminal that is determined based on cell identification information according to some example embodiments. A location based service providing method according to some example embodiments may be performed by a location based service providing apparatus 200 of FIG. 2. In FIG. 2, the location based service providing apparatus 200 may be a separate device that communicates with a mobile terminal 201 in a wired or wireless manner, and may also be the mobile terminal 201 itself.

Referring to FIG. 2, the location based service providing apparatus 200 may comprise one or more computing devices, such as a server, that include at least one processor 210, a bus 220, a network interface 230, a memory 240, a location information database 250, etc. The memory 240 may include an operating system (OS) 241 and a location based service providing routine 242.

The processor 210 may include an information receiver 211, a location determiner 212, and a user setting changer 213, and may be configured by executing the location based service providing routine 242 stored in the memory 240. According to other example embodiments, the location based service providing apparatus 200 may include a greater or lesser number of constituent elements than the number of constituent elements shown in FIG. 2. For example, the location based service providing apparatus 200 may include other constituent elements such as a display, a transceiver, etc.

The memory 240 may include a mass storage device, such as a random access memory (RAM), a read only memory (ROM), a disc drive, a solid state drive, an optical drive, etc., as a non-transitory computer-readable storage medium. Also, program codes (e.g., computer readable instructions) for the OS 241 and the location based service providing routine 242 may be stored in the memory 240. Such software constituent elements may be loaded from another non-transitory computer-readable storage medium separate from the memory 240 using a drive mechanism (not shown). The other non-transitory computer-readable storage medium may include, for example, a floppy disk, a hard disk, a tape storage device, a DVD/CD-ROM, a memory card, etc. Software constituent elements may be loaded to the memory 240 through the network interface 230 instead of, or in addition to, the non-transitory computer-readable storage medium.

The bus 220 enables communication and data transmission between the constituent elements of the location based service providing apparatus 200. The bus 220 may be configured using a high-speed serial bus, a parallel bus, a storage area network (SAN), and/or other appropriate communication technology.

The network interface 230 may be a computer hardware constituent element for connecting the location based service providing apparatus 200 to the computer network. The network interface 230 may connect the location based service providing apparatus 200 to the computer network through a wireless and/or wired connection.

The processor 210 may be configured to process computer-readable instructions of various computer programs by performing a basic arithmetic operation, a logic operation, and/or an input/output operation of the location based service providing apparatus 200. The computer-readable instructions may be provided from the memory 240 and/or the network interface 230 to the processor 210 through the bus 220. The processor 210 may be configured to execute program codes for the information receiver 211, the location determiner 212, and the user setting changer 213. The program codes may be stored in a storage device such as the memory 240.

Figure 4:
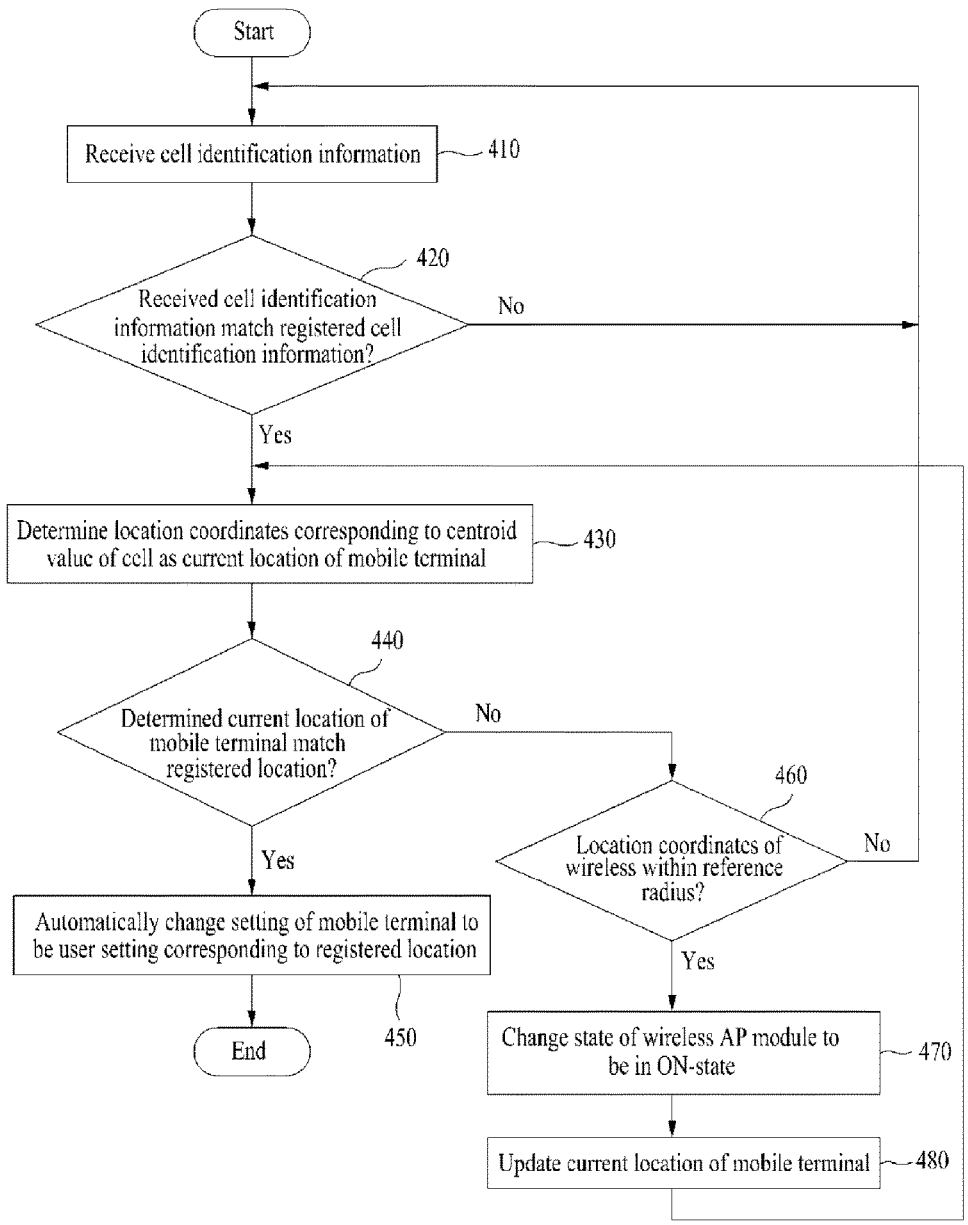
FIG. 4 is a flowchart illustrating an operation of monitoring a current location of a mobile terminal based on cell identification information according to some example embodiments.

When executed by a processor, such as the processor 210, the computer-readable instructions associated with the information receiver 211, the location determiner 212, and the user setting changer 213 transform the processor 210 into a special purpose processor configured to perform at least operations 310 through 340 of FIG. 3 and operations 410 through 480 of FIG. 4.

In operation 310, the information receiver 211 may receive, from the mobile terminal 201, a registration request for location information corresponding to a location to which a user setting is to be applied.

For example, the mobile terminal 201 may register a location to which a user setting is to be applied, such as a company location, by selecting a location registration button displayed on a screen of the mobile terminal 201 through a user interface for an application associated with the location based service providing system. In this example, the information receiver 211 may receive location information of the company through an application installed in the mobile terminal 201. When the user presses the location registration button when the mobile terminal 201 is present at the company, the information receiver 211 may receive a registration of at least one of identification information of a cell (e.g., a cellular service cell tower, a base station, a macro cell access point, a micro cell access point, a femto cell access point, pico cell access point, a Wi-Fi access point, mobile hotspot, etc.) in which the mobile terminal 201 is present and identification information of the one or more wireless APs communicable with the mobile terminal 201 at the company through a user interface that is provided from the application installed in the mobile terminal 201.

For example, the identification information of the cell may include at least one of identification information of a country in which the mobile terminal 201 is located, communication company identification information, location area code (LAC) information, identification information of a base station serving the mobile terminal 201, identification information of a cell covered by the base station, identification information of a wireless AP, identification information of a mobile hotspot, etc. The identification information of the wireless AP may include a MAC address of the wireless AP that performs communication with the mobile terminal 201 through a WiFi module.

In addition, a GPS receiver, a A-GPS receiver, a GLONASS receiver, a beacon transceiver, a Bluetooth transceiver, an RFID transceiver, a NFC transceiver, and/or other location providing systems may be used to provide location information associated with the mobile terminal. The location determiner 212 may register location information of the mobile terminal 201 based on at least one of an available cell ID, a GPS location, a WiFi SSID, a beacon identifier, a Bluetooth device identifier, a RFID identifier, a NFC identifier, etc., and the like. The beacon identifier may include an ID of a beacon transmitter that communicates with the mobile terminal 201. Technology using GPS or WiFi information may relatively accurately verify a location compared to technology using cell identification information, but a large amount of battery is consumed. Further, technology using WiFi or beacon information consumes a relatively small amount of battery, while location verification is available only within the specific range in which an AP or a beacon is present.

Accordingly, the technologies may be employed through appropriate combination depending on desire and/or necessity, in order to verify an accurate location of the mobile terminal 201 and to decrease or alternatively minimize battery consumption amount.

In operation 320, once the location, such as a company location, is registered as a location to which user setting information is to be applied, the user may register the one or more user settings to be applied to the mobile terminal 201 at the location. For example, through a user interface provided from an application installed in the mobile terminal 201, user settings such as a ringer option (e.g., a bell sound notification, vibration mode, silence mode, etc.) of the mobile terminal 201 may be placed in a different setting, such as a vibrating (or mute) mode, a notification of a chat application in a vibrating (or mute) mode, a state of a WiFi module to be in an ON-state, a state of a data network to be in an OFF-state, a state of a music application to be in an ON-state, etc., may be input into the user interface. In other words, the user may register one or more user settings for one or more applications installed on the mobile terminal, of the mobile terminal's operating system, and/or of the mobile terminal itself.

The information receiver 201 may associate the user setting information received through the application associated with the location based service providing system installed in the mobile terminal 201 with location information about the location to which the user setting is to be applied, and may register and store the associated information in a location information database 250.

Here, desired and/or pre-collected location information may be constructed in the location information database 250. For example, user setting information may be matched and/or associated with at least one of an ID of a cell in which the user is present (e.g., the user's office, home, vehicle, school, etc.), a MAC address of a wireless AP module at the location that communicates with the mobile terminal 201, GPS coordinates for the location at which the wireless AP module when the location is registered by the user, a beacon identifier, etc., and thereby be registered to and stored in the location information database 250. When communication is set between the WiFi module and the mobile terminal 201 at the location, user setting information and the MAC address of the wireless AP module that has communicated with the mobile terminal 201 at the time of the location registration may be matched with each other and thereby be registered to and stored in the location information database 250. When the WiFi module is absent or when a communication setting is not performed, GPS coordinates, the ID of the cell, and/or the beacon identifier may be matched with the user setting information of that location and thereby be registered to and stored in the location information database 250.

The location information database 250 may be included in the location based service providing apparatus 200, and if necessary, may be included in the mobile terminal 201 or may be included in both of the location based service providing apparatus 200 and the mobile terminal 201. For example, when the location based service providing apparatus 200 is a server associated with an application installed in the mobile terminal 201, and the location information database 250 is included in the server, the user may keep using without resetting the registered user settings regardless of loss or replacement of the mobile terminal 201.

Additionally, in example embodiments where the location based service providing apparatus 200 is a mobile terminal, the location information database 250 may also be located in an external server and/or in the mobile terminal. In these example embodiments, if the location information database 250 is also located in an external server, the user may again keep using without resetting the registered user settings regardless of loss or replacement of the mobile terminal 201.

A process of registering user settings at a location is described as an example. In addition, the user may also register user settings for various locations such as a home, a business, an office, a school, a library, a store, a vehicle with wireless communication capabilities, and the like.

In operation 330, the location determiner 212 may monitor a current location of the mobile terminal 201. The location determiner 212 may monitor the current location of the mobile terminal 201 based on cell identification information of the mobile terminal 201, GPS coordinates, a wireless AP module, a beacon, and the like.

For example, when the wireless AP module is in an OFF-state, the location determiner 212 may monitor a current location of the mobile terminal 201 based on a cell ID of the mobile terminal 201. In addition, in a situation, for example, a mountainous area, a remote area, etc., in which it is difficult to receive various types of signals, such as the cell ID, the beacon identifier, and the like, the location determiner 212 may monitor the current location of the mobile terminal 201 using GPS coordinates of the mobile terminal 201. When the wireless AP module is in an ON-state, the location determiner 212 may monitor the current location of the mobile terminal 201 based on an ID of the wireless AP.

In operation 340, when the monitored current location of the mobile terminal 201 corresponds to a registered location, the user setting changer 213 may change one or more settings of the mobile terminal 201 (including settings associated with other applications installed on the mobile terminal, the mobile terminal's operating system, the hardware components of the mobile terminal, etc.) to the registered user setting(s). An operation of monitoring a current location of the mobile terminal 201 based on cell identification information will be further described with reference to FIG. 4.

For example, when the monitored current location of the mobile terminal 201 is determined as a company, the user setting changer 213 may automatically change settings of the mobile terminal 201, such as a bell sound and a chat notification of the mobile terminal 201 changed to a vibrating (or mute) mode, a state of the WiFi module to an ON-state, a state of a data network (e.g., 3G data network, 4G LTE data network, etc.) to an OFF-state, a state of a music application to an ON-state, etc. As described above, when the current location of the mobile terminal 201 is present in a place associated with the location registered to the location information database 250, one or more settings of the mobile terminal 201 is changed to be a user setting corresponding to the registered location. Accordingly, the location determiner 212 may monitor the current location of the mobile terminal 201 in real time or at desired and/or preset time intervals through an application associated with the location based service providing system installed in the mobile terminal 201.

In operation 330 of FIG. 3, the current location of the mobile terminal 201 is monitored based on cell identification information collected in the location information database 250. However, when a cell is divided into a femto cell, a microcell, and the like, such as in a downtown area, and/or in an near a subway station, cell identification information may be absent in the location information database 250 regardless of the mobile terminal's establishment of a connection to a new base station serving that area. In this case, the location based service providing apparatus 200 may add, to the location informant database 250, cell ID information of a cell in which the current location of the mobile terminal 201 is present based on cell identification information of a neighboring base station that is located around the current location of the mobile terminal 201. A configuration of adding cell identification information using a neighboring base station will be described with reference to FIG. 5.

FIG. 4 is a flowchart illustrating an operation of monitoring a current location of a mobile terminal based on cell identification information according to some example embodiments.

The mobile terminal 201 may also verify cell identification information of a mobile communication base station that is currently under communication with the mobile terminal 201, without consuming additional battery power, or decreasing battery usage. For example, when the verified cell identification information is registered to the location information database 250, a probability that the mobile terminal 201 is present at a user set location is significantly high. Accordingly, the location determiner 212 may verify the location of the mobile terminal 201 without consuming additional battery power, continuously (or alternatively, at all times or at desired preset time intervals), or decreasing battery usage.

Hereinafter, a description will be made based on an example of combining and thereby utilizing technology for employing cell identification information and technology for employing WiFi information to verify an accurate location of the mobile terminal and to reduce and/or minimize a battery consumption amount.

In operation 410, the information receiver 211 may receive cell identification information of the mobile terminal 201 from the mobile terminal 201 to verify a location associated with user setting information registered for each location, such as a company, a school, a home, a vehicle, and the like. This process may be a process of verifying whether the current location of the mobile terminal 201 is a location registered through matching with the current location of the registered user setting information, for example, a process of verifying whether the current location of the mobile terminal 201 is a location registered to apply user setting information, such as a company, a home, a school, a vehicle, and the like.

In operation 420, the location determiner 212 may verify whether the cell identification information of the mobile terminal 201 matches the registered cell identification information.

Here, in addition to the registered user setting information and location information that are matched with each other to apply user setting information, the location information database 250 may further store information for changing user setting information at a registered location. For example, cell identification information under each base station and location coordinates corresponding to a centroid value of each cell (and/or set of coordinate values indicating the area or scope of the location), which are collected from each base station, may be matched or associated with each other and collected and/or stored in the location information database 250. For example, a centroid value of a cell and/or a set of coordinate values indicating the area or scope of the location may be calculated based on shape and radius information of the cell covered by a base station and the like. Location coordinates corresponding to the centroid value of the cell set of coordinate values indicating the area or scope of the location may include location coordinates of a wireless AP module or GPS coordinates of a location corresponding to the calculated centroid value set of coordinate values indicating the area or scope of the location.

The location determiner 212 may automatically change at least one setting of the mobile terminal 201 to the user setting(s) registered for the determined location based on information collected and/or stored in the location information database 250 and the current location of the mobile terminal 201. An operation of automatically changing the setting(s) of the mobile terminal 201 to be the registered user setting(s) will be described with reference to operations 420 through 450 of FIG. 4.

For example, when cell identification information of the mobile terminal 201 and the registered cell identification information match in operation 420, the location determiner 212 may determine location coordinates corresponding to a centroid value and/or a set of coordinate values indicating the area or scope of the location of a cell in which the mobile terminal 201 is present as the current location of the mobile terminal 201 in operation 430. The location determiner 212 may extract location coordinates corresponding to the centroid value and/or a set of coordinate values indicating the area or scope of the location that matches cell identification information of the mobile terminal 201, and may determine the extracted location coordinates as the current location of the mobile terminal 201 by referring to the location information database 250.

In operation 440, the location determiner 212 may determine whether the determined current location of the mobile terminal 201 matches the registered location. For example, the location determiner 212 may determine whether GPS coordinates indicating the current location of the mobile terminal 201 matches GPS coordinates (that is, GPS coordinates of the location corresponding to the centroid value and/or a set of coordinate values indicating the area or scope of the location) that matches cell identification information registered in the location information database 250 to apply at least one location-by-location user setting. In addition, the location determiner 212 may also determine whether GPS coordinates indicating the current location of the mobile terminal 201 matches GPS coordinates that matches a registered beacon.

When the current location of the mobile terminal 201 and the registered location match in operation 440, the user setting changer 213 may change at least one setting of the mobile terminal 201 to the registered user setting(s) that matches the registered location in operation 450.

On the contrary, when the current location of the mobile terminal 201 and the registered location do not match in operation 440, the location determiner 212 may determine whether the registered location of the wireless AP is present within a reference radius that is desired and/or preset based on location coordinates corresponding to the centroid value of the cell and/or a set of coordinate values indicating the area or scope of the location in operation 460.

When the registered location of the wireless AP module is present within the reference radius in operation 460, the user setting changer 213 may change a state of the wireless AP module of the mobile terminal 201 to be in an ON-state in operation 470. This process may be a process of verifying that the mobile terminal 201 is present at or around the location registered to apply user setting information and determining a further accurate location of the mobile terminal 201 to apply the user setting information.

In operation 480, the location determiner 212 may update the current location of the mobile terminal 201 with the further accurate location determined using the wireless AP module.

For example, when the wireless AP module is in an ON-state, the information receiver 211 may receive, from the mobile terminal 201, identification information of the wireless AP module that currently communicates with the mobile terminal 201. The location determiner 212 may update the current location of the mobile terminal 201 with location information that matches the received identification information of the wireless AP module by referring to the location information database 250. Here, the information receiver 211 may also update the current location of the mobile terminal 201 based on additional location information, such as a GPS receiver, an A-GPS receiver, a GLOSNASS receiver, a beacon transceiver, a Bluetooth transceiver, an RFID transceiver, a NFC transceiver, and/or other location providing systems and the like, of the mobile terminal 201.

As described above, when the registered location of the wireless AP is present within the reference radius, the user setting changer 213 may change a state of the wireless AP module to be in an ON-state. On the contrary, when the registered location of the wireless AP is absent within the reference radius during a desired and/or preset reference time in operation 460, the user setting changer 213 may save battery consumption of the mobile terminal 201 by maintaining the state of the wireless AP module to be in an OFF-state. Through operations 460 through 480, the current location of the mobile terminal 201 is updated based on whether location coordinates of the wireless AP are present within the reference radius. Further, the user setting changer 213 may change a setting of the mobile terminal 201 based on whether a registered location of a beacon transmitter is present within the reference radius. For example, when the registered location of the beacon transmitter that matches the current location of the mobile terminal 201 is present within the reference radius, the user setting changer 213 may change the setting of the mobile terminal 201 to be the registered user setting. Otherwise, the user setting changer 213 may maintain a current setting state instead of changing the setting of the mobile terminal 201. When the current location of the mobile terminal 201 matches the registered location of the beacon transmitter, a probability that the mobile terminal 201 is present around the registered location of the beacon transmitter is significantly high. Accordingly, the user setting changer 213 may maintain the current state and may wait for a desired and/or preset time until the beacon transmitter becomes present within the reference radius. When the beacon transmitter is present in the reference radius within the desired and/or preset time, the user setting changer may change the setting(s) of the mobile terminal 201. When the beacon transmitter is absent within the reference radius even after the desired and/or preset time is elapsed, the location determiner 212 may return to operation 420 and may verify again whether cell identification information of the mobile terminal 201 matches the registered cell identification information.

In the meantime, when registering a location to which at least one user setting is to be applied, the location determiner 212 may determine administrative district information of the mobile terminal 201, may match the administrative district information with at least one of a cell ID, a GPS coordinate, WiFi SSID, a beacon identifier, a Bluetooth device identifier, a RFID identifier, a NFC identifier, etc., and thereby register the matching information to the location information database 250. For example, when a company to which a user setting is to be applied is located in, for example, CC city, BB county, AA state, the location determiner 212 may match the administrative district information "CC city, BB county, AA state" with at least one of a cell ID, a GPS coordinate, WiFi SSID, a beacon identifier, a Bluetooth device identifier, a RFID identifier, a NFC identifier, etc., and thereby register the administrative district information to the location information database 250. In this case, user setting information at the registered location and the administrative district information may be matched with each other and thereby be stored in the location information database 250.

When monitoring the current location of the mobile terminal 201, the user setting changer 213 may determine whether to change a state of the wireless AP module to be in an ON-state or whether to maintain the state of the wireless AP module to be in an OFF-state, based on whether administrative district information of the mobile terminal 201 indicates a detailed administrative district, such as information indicating street-level, building-level, block-level, neighborhood-level, etc., in an upper-level/larger administrative district of a wide geographic range, such as country-level, state-level, etc. For example, when a single cell is located at a boundary of a country, state, etc., two or more separate administrative districts may be included in the single cell. When a cell ID matches a registered cell ID, the location determiner 212 may determine whether administrative district information of the cell ID matches administrative district information that matches the registered cell ID. When the information matches, the user setting changer 213 may precisely find a current location of the mobile terminal 201 by changing the state of the wireless AP module to be in an ON-state. When the information does not match, the location determiner 212 may periodically attempt to verify the administrative district information until the administrative district information of the cell ID matches the administrative district information of the registered cell ID. When the administrative district information does not match even after the desired and/or preset time has elapsed, the information receiver 211 may receive the cell identification information again and the location determiner 212 may repeat the process of verifying whether the received-again-cell identification information is registered information.

Figure 5:
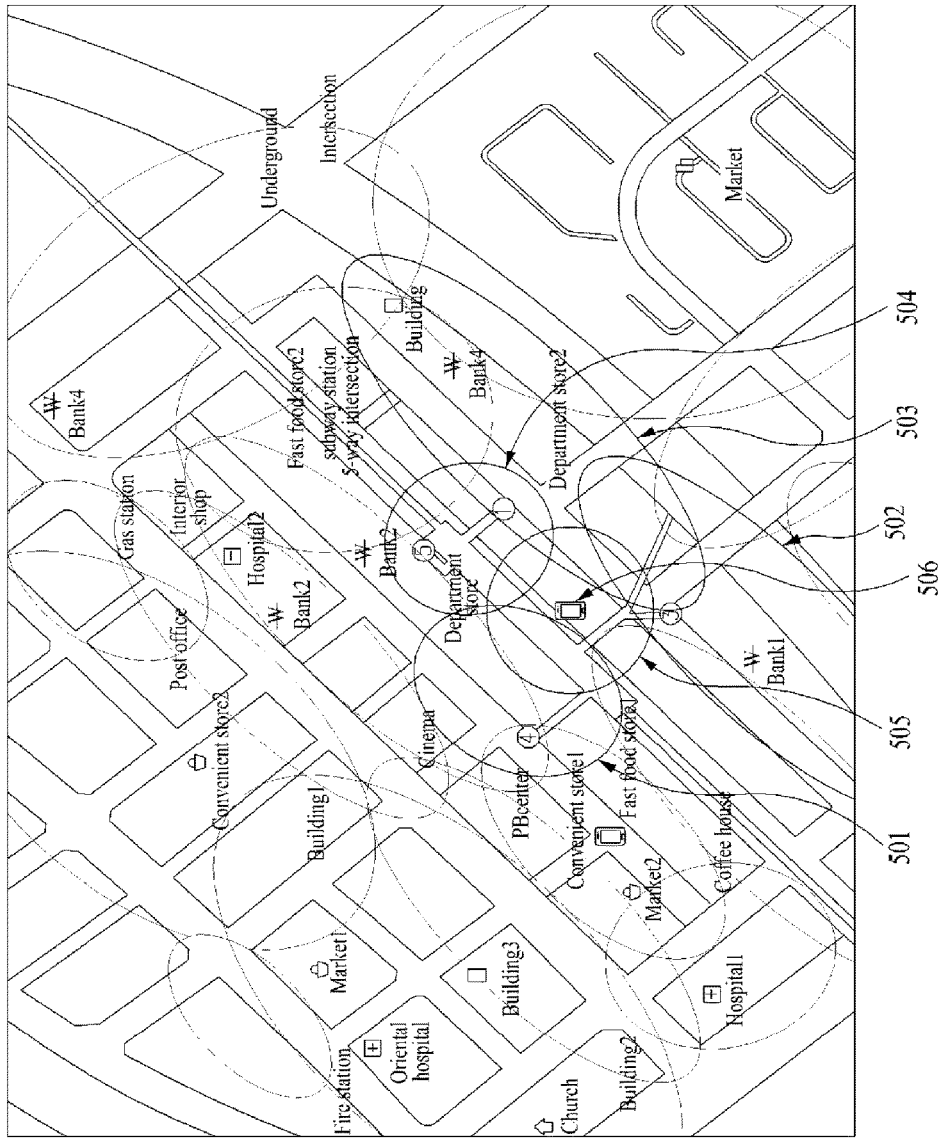
FIG. 5 illustrates an example of estimating a base station based on cell identification information and determining location information of a mobile terminal according to some example embodiments.

FIG. 5 illustrates an example of estimating a base station based on cell identification information and verifying location information of a mobile terminal according to some example embodiments.

An operation of determining location information of the mobile terminal 201 when location coordinates matching cell identification information of the mobile terminal 201 are absent in the location information database 250 will be described with reference to FIG. 5.

Initially, the location determiner 212 may determine, from the location information database 250, one or more neighboring base stations located around a base station that includes the mobile terminal 201, based on cell identification information received at the information receiver 211.

For example, although cell identification information of a cell in which the mobile terminal 201 is currently present is not registered to the location information database 250, the information receiver 211 may receive cell information from a base station that covers the cell.

Here, the location determiner 212 may find one or more neighboring base stations located around the base station that includes the mobile terminal 201 by comparing the received cell identification information and other cell identification information stored in the location information database 250. For example, the location determiner 212 may retrieve, as neighboring base stations, base stations that match base station identification information, LAC information, and the like, included in the received cell information. The location determiner 212 may determine location coordinates of the mobile terminal 201 based on cell identification information of a neighboring base station.

For example, base stations 1, 2, 3, and 4 that cover cells 501, 502, 503, and 504, respectively, may be determined as neighboring base stations. In general, since cell identification information ends with a specific value following a known pattern, such as 11, 17, 19, etc., the location determiner 212 may estimate a location of a base station that includes the mobile terminal 201 based on the cell identification information of the cells 501 through 504. For example, the location determiner 212 may estimate that the base station that includes the mobile terminal 201 is located in the cell 505 based on analyzing the cell identification information of cells 501 through 504.

In this instance, when it is difficult to estimate the base station that includes the mobile terminal 201 or when cell identification information of the mobile terminal 201 is not included in information received at the information receiver 211 due to an estimation error, the location determiner 212 may determine a current location of the mobile terminal 201 based on preceding cell identification information (i.e., the history of the cell identification information previously received by the mobile terminal 201). For example, the location determiner 212 may determine location coordinates that matches the preceding cell identification information as a current location of the mobile terminal 201 and/or may project the current location of the mobile terminal 201 as an adjacent cell to the previous cell by calculating the projected movement of the mobile terminal 201 based on the history of the cell identification information previously received by the mobile terminal 201.

The location determiner 212 may calculate a centroid value based on a shape of the estimated cell 505, and may determine location coordinates 506 corresponding to the calculated centroid value as location information of the mobile terminal 201. The location determiner 212 may determine the shape of the cell 505 based on a radius, a center, a size, etc., of the cell 505, received from the base station that covers the cell 505. Additionally, the information receiver 211 may directly receive information about the cell shape from the base station and/or the location information database 250 as a set of coordinate values indicating the area or scope of the location.

The location determiner 212 may match the location coordinates 506 corresponding to the calculated centroid value with cell identification information of the mobile terminal 201 and may add the matching information to the location information database 250.

Figure 6:
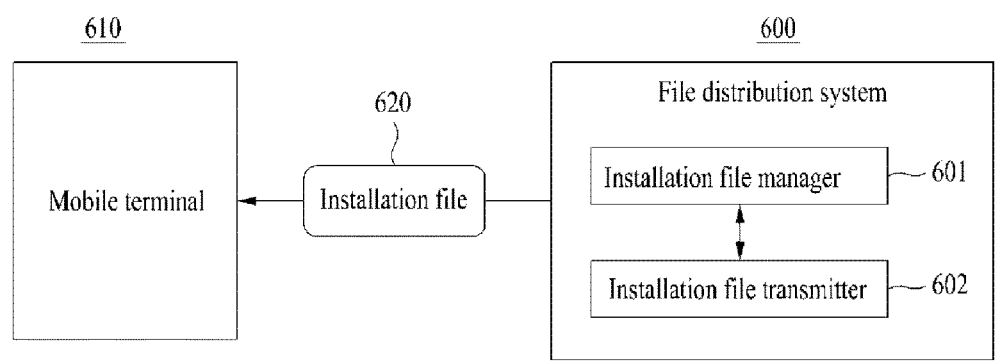
FIG. 6 is a block diagram illustrating an example of an execution environment of a location based service providing method according to some example embodiments.

FIG. 6 is a block diagram illustrating an example of an execution environment of a location based service providing method according to some example embodiments. FIG. 6 illustrates a mobile terminal 610 of a user, a file distribution system 600, and an installation file 620.

The mobile terminal 610 may be a portable device of the user capable of performing mobile communication and data communication, such as a smartphone, tablet, laptop computer, wearable smart device, portable gaming device, personal digital assistant, (PDA), etc. The file distribution system 600 may be a server that provides the installation file 620. For example, the file distribution system 600 may include an installation file manager 601 configured to store and manage the installation file 620 and an installation file transmitter 602 configured to transmit the installation file 620 to the mobile terminal 610 in response to a request from the mobile terminal 610.

The mobile terminal 610 may install an application through the installation file 620 received from the file distribution system 600, and may perform a method of determining a current location of the mobile terminal 610 based on cell information according to example embodiments and a location based service providing method of changing a user setting based on the determined current location and a registered location, through the installed application.

For example, the application may control the mobile terminal 610 to determine location coordinates that matches cell information in a location information database as a current location of the mobile terminal 610. Here, location coordinates matching each set of cell information may be stored in the location information database. The application may control the mobile terminal 610 so that settings of the mobile terminal 610, including settings involving other applications installed on the mobile terminal 610, settings of the operating system of the mobile terminal 610, or the hardware component settings of the mobile terminal 610 itself, may be changed based on location coordinates of the mobile terminal 610 and the registered user setting information. For example, when the current location of the mobile terminal 610 corresponds to a location registered in the location information database to apply the user setting information, the application may control the mobile terminal 610 so that settings of the mobile terminal 610 may be changed based on the user setting information that matches the registered location.

While FIG. 6 depicts a single mobile terminal, installation file, and file distribution system, the example embodiments are not limited thereto, and any number of mobile terminals, location based service providing systems, location information databases, and/or other components may be present in various example embodiments.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular example embodiment, but, where applicable, are interchangeable and can be used in a selected example embodiment, even if not specifically shown or described. The same may also be varied in many ways. Such variations are not to be regarded as a departure from the disclosure, and all such modifications are intended to be included within the scope of the disclosure.

What is claimed is:

1. A location based service providing method performed by a location based service providing apparatus, the method comprising:

receiving, using at least one processor of the location based service providing apparatus, location information for verifying a location of a mobile terminal from the mobile terminal, the location information including cell information of a cell in which the mobile terminal is present;

determining, using the at least one processor, whether the received location information corresponds to registered cell information in a location information database;

associating, using the at least one processor, a location corresponding to the registered cell information as a current location of the mobile terminal, location coordinates corresponding to a centroid value of the cell being determined as the current location of the mobile terminal;

determining, using the at least one processor, whether the current location corresponds to a registered location in the location information database; and changing at least one setting of the mobile terminal to be at least one user setting registered in the location information database, the at least one user setting associated with the registered location in the location information database when the current location corresponds to the registered location in the location information database, wherein
when the current location does not correspond to the registered location in the location information database, the method further comprises,
changing, using the at least one processor, a state of a wireless AP module of the mobile terminal to be in an ON-state in response to the current location being within a desired reference radius from location coordinates corresponding to a wireless AP, and
updating, using the at least one processor, the current location of the mobile terminal using location information associated with the wireless AP with reference to the location information database.

2. The method of claim 1, wherein the determining of the received location information comprises:
determining, as the current location of the mobile terminal, location information that corresponds to at least one of cell information, global positioning system (GPS) coordinates, a beacon identifier, and a media access control (MAC) address of a wireless access point (AP) that indicate the current location of the mobile terminal.

3. The method of claim 1, wherein the changing of the at least one setting of the mobile terminal when the current location corresponds to the registered location in the location information database comprises:
changing a state of a wireless AP module of the mobile terminal based on an analysis of the current location of the mobile terminal and the registered location.

4. The method of claim 3, wherein the changing of the at least one setting of the at least one user terminal comprises:
changing the state of the wireless AP module of the mobile terminal to be in an ON-state in response to the registered location being within the desired reference radius from location coordinates corresponding to a centroid value of a cell in which the mobile terminal is present.

5. The method of claim 3, wherein the determining of the received location information comprises:
updating the current location of the mobile terminal using the wireless AP module of which the state is changed to be in an ON-state; and
the changing of the at least one setting of the mobile terminal includes changing the at least one setting of the mobile terminal to be the at least one user setting in response to an updated current location corresponding to the registered location.

6. The method of claim 1, wherein the determining of the received location information comprises:
estimating a location of a first base station that provides coverage to the mobile terminal based on cell identification information of a neighboring second base station located proximate to the first base station, in response to cell information of the mobile terminal being absent in the location information database; and
determining the current location of the mobile terminal based on a cell shape corresponding to the estimated location of the first base station.

7. The method of claim 6, wherein the determining of the current location of the mobile terminal based on the cell shape comprises:
determining, as the current location of the mobile terminal, location coordinates corresponding to a centroid value of a cell covered by the estimated location of the first base station; and
matching location coordinates corresponding to the centroid value of a cell in which the mobile terminal is present with cell identifier information of the cell, and adding the matching information to the location information database.

8. The method of claim 1, wherein the received location information includes cell information indicating the current location of the mobile terminal, the cell information including:
at least one of identification information of a country in which the mobile terminal is located, communication company identification information, location area code (LAC) information, identification information of a base station that provides coverage to the mobile terminal, and identification information of a cell covered by the base station.

9. A location based service providing apparatus comprising:
a memory having computer readable instructions stored thereon; and
at least one processor configured to execute the computer readable instructions to,
receive location information for verifying a location of a mobile terminal from the mobile terminal, the location information including cell information of a cell in which the mobile terminal is present;
determine whether the received location information that corresponds to registered cell information in a location information database as a current location of the mobile terminal;
associate a location corresponding to the registered cell information as a current location of the mobile terminal, location coordinates corresponding to a centroid value of the cell being determined as the current location of the mobile terminal;
determining, using the at least one processor, whether the current location corresponds to a registered location in the location information database; and
change at least one setting of the mobile terminal to be at least one user setting registered in the location information database, the at least one user setting associated with the registered location in the location information database when the current location corresponds to the registered location in the location information database, wherein
when the current location does not correspond to the registered location in the location information database, the at least one processor is further configured to,
change a state of a wireless AP module of the mobile terminal to be in an ON-state in response to the current location being within a desired reference radius from location coordinates corresponding to a wireless AP, and
update the current location of the mobile terminal using location information associated with the wireless AP with reference to the location information database.

10. The location based service providing apparatus of claim 9, wherein the at least one processor is further configured to:
determine, as the current location of the mobile terminal, location information that matches at least one of cell information, global positioning system (GPS) coordinates, a beacon identifier, and a media access control (MAC) address of a wireless access point (AP) that indicate the current location of the mobile terminal.

11. The location based service providing apparatus of claim 9, wherein the at least one processor is further configured to:
  change a state of a wireless AP module of the mobile terminal based on an analysis of the current location of the mobile terminal and the registered location when the current location corresponds to the registered location in the location information database.

12. The location based service providing apparatus of claim 11, wherein the at least one processor is further configured to:
  update the current location of the mobile terminal using the wireless AP module of which the state is changed to be in an ON-state; and
  changing the at least one setting of the mobile terminal includes changing the at least one setting of the mobile terminal to be the at least one user setting in response to the updated current location corresponding to the registered location.

13. The location based service providing apparatus of claim 9, wherein the at least one processor is further configured to:
  estimate a location of a first base station that provides coverage to the mobile terminal based on cell identification information of a neighboring second base station located proximate to the first base station, in response to cell information of the mobile terminal being absent in the location information database; and
  determine the current location of the mobile terminal based on a cell shape corresponding to the estimated location of the first base station.

14. A system for providing location based services comprising:
  at least one mobile terminal and configured to collect location information related to the at least one mobile terminal; and
  at least one server, the server including at least one processor and a location information database including at least one registered cell information, the at least one registered cell information corresponding to at least one location to which at least one user setting is to be applied on the at least one mobile terminal, and
  the at least one processor configured to,
    receive the collected location information from the at least one mobile terminal, the location information including cell information of a cell in which the mobile terminal is present,
    determine whether the received collected location information corresponds to at least one of the registered cell information,
    associate a location corresponding to the registered cell information as a current location of the mobile terminal, location coordinates corresponding to a centroid value of the cell being determined as the current location of the mobile terminal,
    determine whether the current location corresponds to a registered location in the location information database, and
    transmit at least one change setting instruction, to the at least one mobile terminal the change setting instruction including the at least one user setting to be applied when the current location corresponds to the registered location in the location information database, wherein
    when the current location does not correspond to the registered location in the location information database, the at least one processor is further configured to,
      change a state of a wireless AP module of the mobile terminal to be in an ON-state in response to the current location being within a desired reference radius from location coordinates corresponding to a wireless AP, and
      update the current location of the mobile terminal using location information associated with the wireless AP with reference to the location information database.

15. The system of claim 14, wherein the at least one mobile terminal further comprises:
  a memory having at least one application stored thereon; and
  at least one processor configured to execute the at least one application to,
    receive the transmitted at least one change setting instruction, and
    apply the at least one user setting to at least one setting of the mobile terminal.

16. The system of claim 14, wherein the at least one mobile terminal further comprises:
  at least one wireless AP transceiver configured to perform at least one of WiFi communications, 3G mobile communications, 4G mobile communications, GSM communications, and CDMA communications;
  at least one of a GPS receiver, a beacon transceiver, a Bluetooth transceiver, a RFID transceiver, and a NFC transceiver; and
  the at least one processor of the mobile terminal configured to collect cell identification information using the at least one wireless AP transceiver.

17. The system claim of claim 14, wherein the at least one change setting relates to at least one setting associated with an application installed on the mobile terminal, an operating system installed on the mobile terminal, and a hardware component of the mobile terminal.

* * * * *